Sept. 2, 1958 B. W. OSWALT 2,849,865
FLUID CONTROL MECHANISM
Filed March 19, 1957
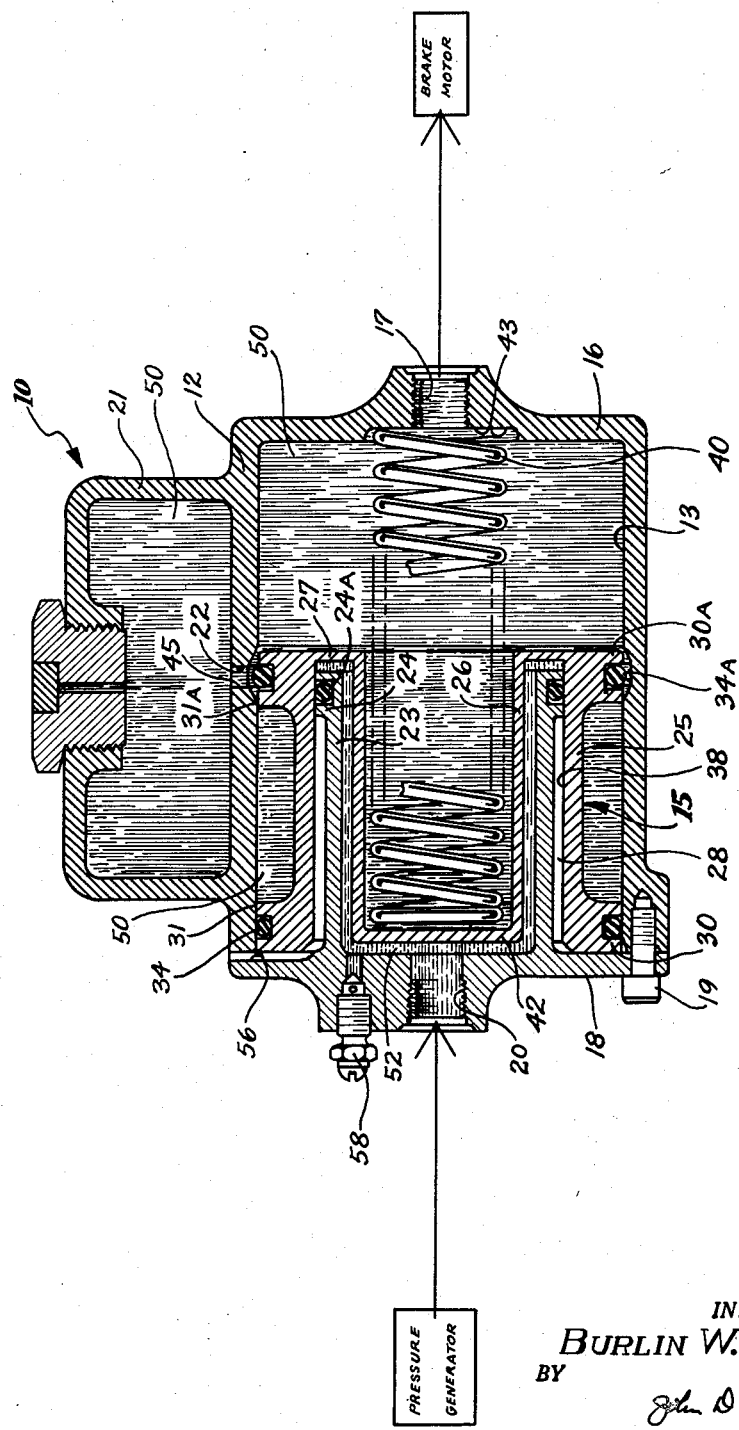
INVENTOR.
BURLIN W. OSWALT
BY
ATTY.

United States Patent Office 2,849,865
Patented Sept. 2, 1958

2,849,865

FLUID CONTROL MECHANISM

Burlin W. Oswalt, Union, Ohio, assignor to The B. F. Goodrich Company, New York, N. Y., a corporation of New York Application March 19, 1957, Serial No. 647,065

2 Claims. (Cl. 60—54.6)

This invention relates to fluid control mechanisms and more particularly to mechanisms of this class embodying a differential area piston for transmitting fluid pressure and displacing fluid in accordance with the area ratio of the piston faces. The invention provides a differential area piston mechanism especially useful in aircraft hydraulic systems as a brake master cylinder, or as a so-called pressure "debooster."

The differential area piston mechanism of this invention is characterized by a particular arrangement of its parts which provide an unusually compact structure and which further provides for effective separation or isolation of the fluid exposed to the opposing pressure faces of the piston. In general the mechanism of this invention uniquely incorporates what in effect is two separate piston-and-cylinder assemblies into the space envelope normally required by one such assembly.

The compactness of the mechanism of this invention with the consequent reduction in weight as compared with other devices for the same function makes this mechanism especially valuable for aircraft applications where space and weight are critical factors. Moreover, this mechanism is designed so that there are at least two mutually independent slidable sealing devices providing a fluid tight barrier between the fluid acting on the opposing faces of the piston at any operating position. This feature is particularly advantageous for hydraulic systems such as those of aircraft where commonly one pressure face of the piston is exposed to a hydraulic fluid which is chemically incompatible with the fluid acting on the opposite pressure face of the piston so that it is necessary to prevent intermixture of the fluids.

The invention will be further described with reference to the accompanying drawing which shows a longitudinal axial cross-sectional view of an aircraft brake master cylinder assembly made in accordance with and embodying this invention.

In the drawing, the master cylinder assembly 10 includes a main casing 12 which is bored axially to provide a cylinder wall 13 for the reception of a single movable piston element 15.

The structural details of the casing 12 includes an integral end wall 16 having an outlet port 17 providing communication between the inside of the casing and suitable pipes (not shown) leading to a brake motor. The opposite end of the casing is covered by a removable end cap 18 which is secured to the casing by bolts 19 and which includes an inlet port 20 providing communication between the inside of the casing and a suitable fluid pressure generator (not shown). A fluid reservoir 21 is located on the upper outside surface of the casing and arranged to supply fluid by gravity to the outlet end of the cylinder 13 through a port 22 in the casing wall as hereinafter explained.

The removable end cap 18 of the casing includes an integral tubular cylindrical wall 23 which projects axially into the cylinder 13 and extends through about half the length of the cylinder. The axial length of wall 23 exceeds the maximum stroke of the piston element 15 inside the casing. The wall 23 terminates in a radial flange 24 which is encircled by an external O-ring seal 24A.

The piston element 15 is formed with an annular outer wall 25 and an inner cylindrical hollow cup-shaped portion 26 which is integrally connected to the wall 25 in concentric relation by a radial wall portion 27. The wall 25 and the cup portion 26 are radially spaced apart by an annular channel 28. At the opposite ends of the wall 25 of the piston element there are annular radial flanges 30 and 30A, having external cylindrical bearing surfaces 31 and 31A respectively for slidably engaging the wall of the cylinder 13. The external bearing surfaces 31 and 31A, respectively, are encircled circumferentially with O-ring seals 34 and 34A for effecting fluid tight slidable engagement with the opposing wall of cylinder 13.

The piston element 15 is fitted into the cylinder 13 with the open end of cup portion 26 of the piston directed toward the outlet port 17 of the casing, and with the cup portion 26 extending telescopically inside the cylindrical wall 23 of end cap 18. As illustrated, the wall 23 projects concentrically into the annular channel 28 of the piston in the assembly so that the external surface of flange 24 together with the O-ring seal 24A bears slidably in fluid tight engagement against an internal cylindrical surface 38 of piston element 15. Surface 38 is the internal side of wall 25 of the piston and is formed smooth and of accurate axial shape so that it functions as a cylinder embracing piston-like flange 24 during reciprocation of the piston element 15. The axial length of surface 38 exceeds the maximum stroke of the piston in the casing and the surface 38 lies wholly within the region bounded by the external bearing surfaces 31 and 31A of the piston.

The inactive or non-actuated position of the piston element 15 is the illustrated position where the piston is seated against the removable end cap 18 of the casing. The piston is urged to this position by a spring 40 which is disposed axially through the cylinder 13 and which is adapted to oppose axial movement of the piston rightward in the cylinder. One end of spring 40 projects inside the cup portion 26 and bears against the end wall 42 enclosing the cup portion. The opposite end of spring 40 bears against end cap 16 of the casing in a socket 43. The axial length of the cup portion 26 may be varied to suit the length of spring 40 required. In general the cup portion 26 is designed so that the coils of the spring may be compressed without bottoming against each other when the piston is displaced through its maximum stroke, viz., the distance between the rightward face of the piston in the drawing and the outlet fluid end cap 16.

In the non-actuated position of the piston element 15, the flange 30A and its seal 34A are in register with a groove 45 extending circumferentially around cylinder 13 and communicating with the port 22 from reservoir 21. The groove 45 is defined by opposing surfaces which taper axially outward from the wall of cylinder 13 to a depth slightly greater than the relaxed or uncompressed diameter of O-ring 34A. Thus when the piston is in its non-actuated position, fluid 50 from the reservoir 21 may leak past the seal 34A and flange 30A to maintain the low pressure region inside the casing to the right of piston 15 full of fluid and thus replenish any fluid which may leak through the pipe fittings when the brake is applied. In operation, the O-ring 34A is compressed by the tapering side of the groove 45 into sealing engagement with the wall of cylinder 13 as soon as the piston is moved rightward sufficiently to advance its flange 30A beyond groove 45. The space between the flanges 30A and 30 of the piston will normally be filled with a body of fluid 50 from the reservoir which is merely carried by the piston as the piston is reciprocated in operation and which at all times is under the same pressure as the fluid in the reservoir, usually atmospheric pressure.

In the usual service for this assembly the fluid 50 in the reservoir 21 and which fills the spaces at the right of the piston and the connections (not shown) to the brake motor is a hydraulic liquid having a boiling point suitable for the temperature and pressure encountered in the brake motor. This liquid usually will be of a different chemical nature than the actuating fluid 52 delivered to the inlet port 20 and to distinguish the brake operating liquid 50 from actuating fluid 52 in the drawing, the former is indicated by broken vertical lines whereas the latter is indicated by horizontal broken lines. The actuating fluid 52 is usually the hydraulic liquid of the general hydraulic system of the aircraft. The external surfaces of the cup portion 26 of the piston are spaced slightly from the wall 23 and these spaces are normally filled with the actuating fluid 52. The O-ring 24A prevents leakage of fluid into the region of the external surface of wall 23.

Owing to the location of the O-ring 24A in this assembly, the effective high pressure area of the piston element 15 (the area subjected to actuating fluid 52) is the area encompassed by the internal surface 38 of the wall portion 25 of the piston. On the other hand, the effective low pressure area of the piston (the area subjected to the brake operating liquid 50) is the larger area encompassed by the wall of cylinder 13.

When the actuating fluid 52 is pressurized, the piston element 15 is urged forwardly, closing off port 22 to exert pressure on the brake operating liquid 50 and to displace the latter through the outlet port 17 to apply the brakes. The pressure exerted on the liquid 50 and the volume of it displaced varies with ratio of the effective pressure areas of the faces of the piston in the usual manner. When the pressure of the actuating fluid 52 is relieved, the spring 40 returns the piston element 15 to the illustrated position. Following a brake application in which the brake fluid 50 is heated substantially, the reservoir 21 can function as an expansion chamber for this liquid through the agency of groove 45 and port 22 when the piston 15 has been retracted.

It may be noted that throughout the stroke of the piston element 15 the actuating fluid 52 and the brake fluid 50 are separated by two independent seals, the O-ring 24A which restricts the actuating fluid 52, and the O-ring 34 which seals the brake fluid 50. Moreover, although the space envelope required for the mechanism is merely that for a piston having a stroke and a diameter equal to the diameter of the low pressure face of piston element 15, a high pressure piston-and-cylinder unit composed of the cup portion 26, and walls 23 and 25 is additionally provided in the same envelope and which functions so that no surface of the mechanism exposed to one of the fluids during operation is ever additionally exposed to the other fluid.

The casing 12 preferably includes a vent 56 to the surroundings to drain off any fluid of either type which may leak by the O-ring seals 24A and/or 34. The casing further includes a bleeder fitting 58 attached to the end cap 18 to bleed the actuating fluid when the mechanism is installed. Bleeding of the brake fluid 50 may be accomplished by similar fittings on the equipment operated by the assembly.

Variations in the construction described may be made within the scope of the appended claims.

I claim:

1. A differential-area piston mechanism comprising a casing having an internal cylinder wall and opposing end wall portions, a fluid inlet and a fluid outlet in said opposing end wall portions, a piston element inside the casing defining with the outlet end portion a low pressure fluid chamber, said piston including a tubular wall projecting axially toward said inlet end portion and having axially spaced external sealing surfaces slidably engaging said casing cylinder wall and also having an internal cylindrical surface portion concentric therewith, the axial length of said tubular wall exceeding the maximum available stroke of said piston element in the casing, a stationary tubular wall projecting axially into said casing from said inlet end portion and having its interior communicating with said inlet and having an axial length exceeding the maximum available stroke of said piston in said casing, said stationary tubular wall extending concentrically within said tubular wall of said piston and means adjacent the axial extremity of said stationary tubular wall effecting sealed slidable engagement with said internal cylindrical surface of the tubular wall of said piston, and said piston including an integral axial cup portion projecting concentrically into said stationary tubular wall with a closed end of the cup adjacent said inlet therein, said closed end of the cup portion defining with said stationary tubular wall portion of the casing a high pressure fluid chamber, and said cup portion having an open end directed toward said low pressure chamber, and a coil spring seated in said cup portion and caged under compression between the bottom of said cup portion and the outlet end portion of said casing for opposing axial movement of said piston toward said outlet end portion.

2. Mechanism in accordance with claim 1 and further including means for replenishing fluid of said low pressure chamber from a source independent of the fluid in said high pressure chamber.

References Cited in the file of this patent
UNITED STATES PATENTS

| | | |
|---|---|---|
| 1,010,000 | Snyder | Nov. 28, 1911 |
| 2,296,145 | Christensen | Sept. 15, 1942 |
| 2,396,155 | Christensen | Mar. 5, 1946 |